Patented July 2, 1946

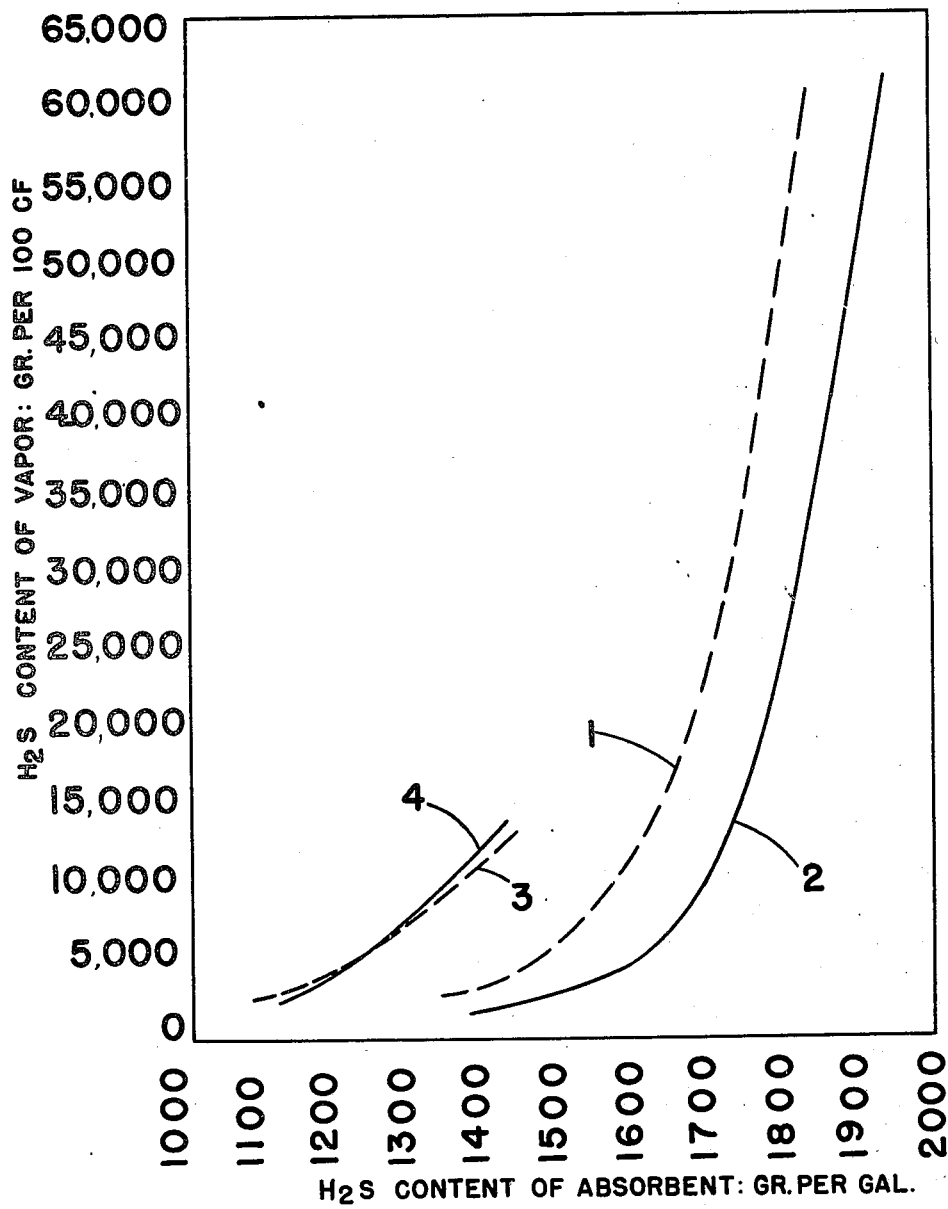
EFFECT OF THE ADDITION OF CHARCOAL ON THE SOLUBILITY OF HYDROGEN SULFIDE IN POTASSIUM PHENOLATE SOLUTION.

2,403,319

UNITED STATES PATENT OFFICE 2,403,319

REMOVAL OF H₂S FROM GASES

Milton Williams, Houston, Tex., assignor to Standard Oil Development Company, a corporation of Delaware Application June 20, 1942, Serial No. 447,767

4 Claims. (Cl. 23—2)

The present invention is directed to a method for removing acidic components, such as $H_2S$, $SO_2$ and $CO_2$, from gas mixtures.

A conventional method for the removal of an acidic constituent, such as $H_2S$, $SO_2$ or $CO_2$, from a gas mixture has been to scrub the gas mixture with an aqueous solution of a base and then to regenerate the absorbent by heating. A development of this basic principle has been to add to the absorbent a substance which makes the absorbent only slightly acidic at absorption temperature but more acidic at regenerating temperature. This addition agent does not interfere with the absorption of the acidic constituent, but improves considerably the removal of this constituent from the absorption in the regeneration step.

I have now found that the absorption capacity of an absorbent, of the type containing a base and an acidic substance, which becomes more acidic with an increase in temperature can be increased by adding to the mixture a solid adsorbent which has a preferential adsorbtivity for acidic materials. The amount of solid adsorbent added is not such that it could effect a substantial increase in the amount of acidic gaseous constituents removed from the gas mixture. It functions to increase the efficiency of the process by increasing the basicity of the absorbent during the absorption step without substantially decreasing its acidity during the regenerating step as compared to the same absorbent without the solid adsorbent. Thus it increases the amount of gaseous acidic component which is absorbed from the gas mixture being treated while at the same time permitting the absorbent to be brought back by regeneration to substantially the same residual content of said gaseous constituent.

In a process of the aforesaid type, the absorption step is usually conducted at substantially atmospheric temperature while the regeneration step is conducted at about 210° F. or at the temperature of boiling water. It will, of course, be understood that the absorption step can be conducted at temperatures below atmospheric with some advantage within limits dictated by the cost of reducing the temperature.

The amount of solid adsorbent to be added to the liquid absorbent may vary within rather wide limits. An upper limit is set by the fact that the process is a cyclic one necessitating that the absorbent be pumpable. So the viscosity of the resulting mixture is the determining factor of the upper limit of the amount of solid adsorbent which may be added. It may be stated that the effect of the solid adsorbent becomes noticeable when about ½ pound of adsorbent per gallon of liquid absorbent is used. The best amount to be used for any given operation may readily be determined by a few preliminary experiments.

A number of solid adsorbents, including various types of clay, may be found which have a preferential adsorptive ability for acidic materials. The material which I prefer to use is one obtained by activating charcoal by heating in the presence of air. It is important that air be the atmosphere around the charcoal while it is being heated, since a different atmosphere, such as carbon dioxide or steam, would result in an activated charcoal having a preferential adsorbtivity for basic materials.

The nature of the present invention may be better understood from the following description of the accompanying drawing in which the single figure is a set of curves showing the affect of the additional of charcoal, activated as described above, on a liquid absorbent containing 1.40 pounds of phenol and .47 pound of KOH per gallon of water. The amount of charcoal employed was 1.66 pounds per gallon of absorbent. Referring to the drawing in detail, the abscissae represent the $H_2S$ content of the absorbent and the ordinates represent the $H_2S$ content of the gas undergoing purification. Numeral 1 designates a curve showing the amount of $H_2S$ contained in each gallon of spent absorbent after purification of gases of different $H_2S$ contents while curve 2 designates similar values for the mixture of absorbent and adsorbent, the purification in each case having been conducted at a temperature between 80 and 85° F. Curve 3 represents the amount of residual $H_2S$ in the absorbent without the adsorbent after regeneration at 200° F., while curve 4 is a similar curve for the mixture of absorbent and adsorbent.

If it be assumed that the gas to be purified contains 10,000 grains of $H_2S$ per hundred cubic feet, it will be seen that the absorbent alone, when spent, contained about 1590 grains of $H_2S$ per gallon of absorbent, while the absorbent plus the adsorbent contained about 1710 grains of $H_2S$ per gallon. The regeneration step may be carried out to any desired residual $H_2S$ content of the absorbent or, to put it another way, to any desired $H_2S$ content of the vapors leaving the regenerating chamber. It will be observed that curves 3 and 4 lie pretty close together so that whatever degree of regeneration is desired the mixture of adsorbent plus absorbent can be reduced to substantially the same, or perhaps a lower, residual content of H2S as the absorbent alone.

In the foregoing discussion emphasis has been laid on the removal of hydrogen sulphide from gas mixtures by scrubbing with a mixture of phenol and a base. As previously indicated, other acidic constituents may be removed from gases by the method of the present invention. Also other acidic substances may be used in the absorbent in place of phenol as for example, phosphoric acid, cresols, xylenols, and the like.

The nature and objects of the present invention having been thus described and illustrated, what is claimed as new and useful and is desired to be secured by Letters Patent is:

1. A method for removing an acidic constituent from a gas which comprises scrubbing the gas with a liquid mixture containing a combination of a basic material and a slightly acidic material of the phenolic type of compound, said mixture being one the acidity of which tends to increase with temperature, and carrying in suspension an adsorbent having a preferential adsorbtivity for acidic substances in an amount insufficient to render the mixture unpumpable.

2. A method according to claim 1 in which the acidic constituent of the gas is hydrogen sulfide.

3. A method according to claim 1 in which the adsorbent is a charcoal activated by a heat treatment in the presence of air.

4. A method according to claim 1 in which the acidic constituent of the gas is hydrogen sulfide and the adsorbent is a charcoal activated by a heat treatment in the presence of air.

MILTON WILLIAMS.